(12) United States Patent
Ganapavarapu et al.

(10) Patent No.: US 12,462,192 B2
(45) Date of Patent: Nov. 4, 2025

(54) ADAPTIVE RETRAINING OF AN ARTIFICIAL INTELLIGENCE MODEL BY DETECTING A DATA DRIFT, A CONCEPT DRIFT, AND A MODEL DRIFT

(71) Applicant: International Business Machines Corporation, Armonk, NY (US)

(72) Inventors: Venkata Sitaramagiridharganesh Ganapavarapu, Elmsford, NY (US); Kyong Min Yeo, Scarsdale, NY (US); Nianjun Zhou, Chappaqua, NY (US); Wesley M. Gifford, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 17/663,848

(22) Filed: May 18, 2022

(65) Prior Publication Data
US 2023/0376825 A1    Nov. 23, 2023

(51) Int. Cl.
*G06N 20/00*    (2019.01)
(52) U.S. Cl.
CPC ..................... *G06N 20/00* (2019.01)
(58) Field of Classification Search
CPC ........................................................ G06N 20/00
See application file for complete search history.

(56) References Cited

U.S. PATENT DOCUMENTS

| | | | |
|---|---|---|---|
| 10,163,061 B2 | 12/2018 | Grove | |
| 10,586,164 B1 | 3/2020 | Sengupta | |
| 10,599,957 B2 | 3/2020 | Walters | |
| 11,030,536 B2 | 6/2021 | Lamparter | |
| 2017/0330109 A1 | 11/2017 | Maughan | |

(Continued)

FOREIGN PATENT DOCUMENTS

| | | | |
|---|---|---|---|
| CN | 113033643 A | 6/2021 | |
| CN | 113869526 A | 12/2021 | |
| EP | 3405843 B1 | 8/2020 | |

OTHER PUBLICATIONS

Fusco et al., "Data Processing Application System Management in Non-Stationary Environments", U.S. Appl. No. 17/452,517, filed Oct. 27, 2021, 52 pages.

(Continued)

*Primary Examiner* — Pei Yong Weng
(74) *Attorney, Agent, or Firm* — Joseph P. Curcuru

(57) ABSTRACT

A computer-implemented method, a computer program product, and a computer system for adaptive retraining of an artificial intelligence model. A computer system computes drift magnitude scores for respective drift functions. A computer system computes an aggregated data drift score for a data drift, an aggregated concept drift score for a concept drift, and an aggregated model drift score for a model drift. A computer system computes an overall drift score, based on the aggregated data drift score, the aggregated concept drift score, the aggregated model drift score, a predetermined data drift threshold, a predetermined concept drift threshold, and a predetermined model drift threshold. A computer system determines whether retraining of the artificial intelligence model is required, based on the overall drift score. A computer system performs the retraining of the artificial intelligence model, in response to determining the retraining of the artificial intelligence model is required.

20 Claims, 10 Drawing Sheets

(56) References Cited

U.S. PATENT DOCUMENTS

| | | |
|---|---|---|
| 2018/0012145 A1 | 1/2018 | Maurya |
| 2021/0334695 A1 | 10/2021 | Raj |
| 2022/0011760 A1 | 1/2022 | Zhou |
| 2022/0024032 A1 | 1/2022 | Singh |
| 2022/0051129 A1 | 2/2022 | Malvankar |

OTHER PUBLICATIONS

Gama et al., "A Survey on Concept Drift Adaptation", ACM Computing Surveys, vol. 46, No. 4, Article 44, Publication date: Mar. 2014, 37 pages.

Lipton et al., "Detecting and Correcting for Label Shift with Black Box Predictors", Proceedings of the 35 th International Conference on Machine Learning, Stockholm, Sweden, PMLR 80, 2018, 9 pages.

Moreno-Torres et al., "A unifying view on dataset shift in classification", Pattern Recognition 45 (2012), © 2011 Elsevier Ltd., 10 pages.

Rabanser et al., "Failing Loudly: An Empirical Study of Methods for Detecting Dataset Shift", 33rd Conference on Neural Information Processing Systems (NeurIPS 2019), Vancouver, Canada, 13 pages.

Webb et al., "Analyzing concept drift and shift from sample data", Article in Data Mining and Knowledge Discovery, Sep. 2018, Research Gate, 20 pages.

Wu et al., "DeltaGrad: Rapid retraining of machine learning models", arXiv:2006.14755v2 [cs.LG] Jun. 20, 2020, 65 pages.

Mell et al., "The NIST Definition of Cloud Computing", NIST National Institute of Standards and Technology U.S. Department of Commerce, Special Publication 800-145, Sep. 2011, 7 pages.

| Data Drift | Concept Drift | Model Drift | Overall Drift (Retraining Required) | Actions |
|---|---|---|---|---|
| True | True | True | True | Incorporate drifted input data and drifted targets into new train data. Perform hyperparameter search. |
| True | True | False | True | Incorporate drifted input data and drifted targets into new train data. A new model is selected. |
| True | False | True | True | Incorporate drifted input data into new train data. Perform hyperparameter search. |
| False | True | True | True | Incorporate drifted targets into new train data. Perform hyperparameter search. |
| False | True | False | True | A new model is selected and retrained with new train data along with target relabeling. |
| False | False | True | True | A new model is selected. |
| True | False | False | False | A warning of a data drift is issued. |
| False | False | False | False | No action is taken. |

FIG. 4

ADAPTIVE RETRAINING OF AN ARTIFICIAL INTELLIGENCE MODEL BY DETECTING A DATA DRIFT, A CONCEPT DRIFT, AND A MODEL DRIFT

BACKGROUND

The present invention relates generally to artificial intelligence models, and more particularly to adaptive retraining of an artificial intelligence model by detecting a data drift, a concept drift, and a model drift.

In enterprise artificial intelligence (AI) systems, specifically in industrial Internet of Things (IoT) systems, multiple AI models are prepared and deployed to fulfill business requirements. Monitoring the behavior of these AI models and retrain as the model performance degrades by identifying suitable retraining data is essential to the business. Analysis of the models alone is not sufficient to decide on whether to retrain or to select data for the retraining. It is also required to identify changes in input data (features) and targets (ground truth) to perform retraining. Although various algorithms exist to identify various types of drifts, e.g., a data drift, a concept (target) drift, and a model drift, a system that enables an automated analysis of these drifts and the relationship between them is required for business personnel.

SUMMARY

In one aspect, a computer-implemented method for adaptive retraining of an artificial intelligence model is provided. The computer-implemented method includes computing drift magnitude scores for respective drift functions. The computer-implemented method further includes computing an aggregated data drift score for a data drift, an aggregated concept drift score for a concept drift, and an aggregated model drift score for a model drift. The computer-implemented method includes computing an overall drift score, based on the aggregated data drift score, the aggregated concept drift score, the aggregated model drift score, a predetermined data drift threshold, a predetermined concept drift threshold, and a predetermined model drift threshold. The computer-implemented method includes determining whether retraining of the artificial intelligence model is required, based on the overall drift score. The computer-implemented method includes performing the retraining of the artificial intelligence model, in response to determining the retraining of the artificial intelligence model is required.

In another aspect, a computer program product for adaptive retraining of an artificial intelligence model is provided. The computer program product comprises a computer readable storage medium having program instructions embodied therewith, and the program instructions are executable by one or more processors. The program instructions are executable to: compute drift magnitude scores for respective drift functions; compute an aggregated data drift score for a data drift, an aggregated concept drift score for a concept drift, and an aggregated model drift score for a model drift; compute an overall drift score, based on the aggregated data drift score, the aggregated concept drift score, the aggregated model drift score, a predetermined data drift threshold, a predetermined concept drift threshold, and a predetermined model drift threshold; determine whether retraining of the artificial intelligence model is required, based on the overall drift score; and perform the retraining of the artificial intelligence model, in response to determining the retraining of the artificial intelligence model is required.

In yet another aspect, a computer system for adaptive retraining of an artificial intelligence model is provided. The computer system comprises one or more processors, one or more computer readable tangible storage devices, and program instructions stored on at least one of the one or more computer readable tangible storage devices for execution by at least one of the one or more processors. The program instructions are executable to compute drift magnitude scores for respective drift functions. The program instructions are further executable to compute an aggregated data drift score for a data drift, an aggregated concept drift score for a concept drift, and an aggregated model drift score for a model drift. The program instructions are further executable to compute an overall drift score, based on the aggregated data drift score, the aggregated concept drift score, the aggregated model drift score, a predetermined data drift threshold, a predetermined concept drift threshold, and a predetermined model drift threshold. The program instructions are further executable to determine whether retraining of the artificial intelligence model is required, based on the overall drift score. The program instructions are further executable to perform the retraining of the artificial intelligence model, in response to determining the retraining of the artificial intelligence model is required.

BRIEF DESCRIPTION OF THE SEVERAL VIEWS OF THE DRAWINGS

FIG. 4 illustrates an example of relationships between a data drift score, a concept drift score, a model drift score, and an overall drift score, in accordance with another embodiment of the present invention.

DETAILED DESCRIPTION

Figure 1:
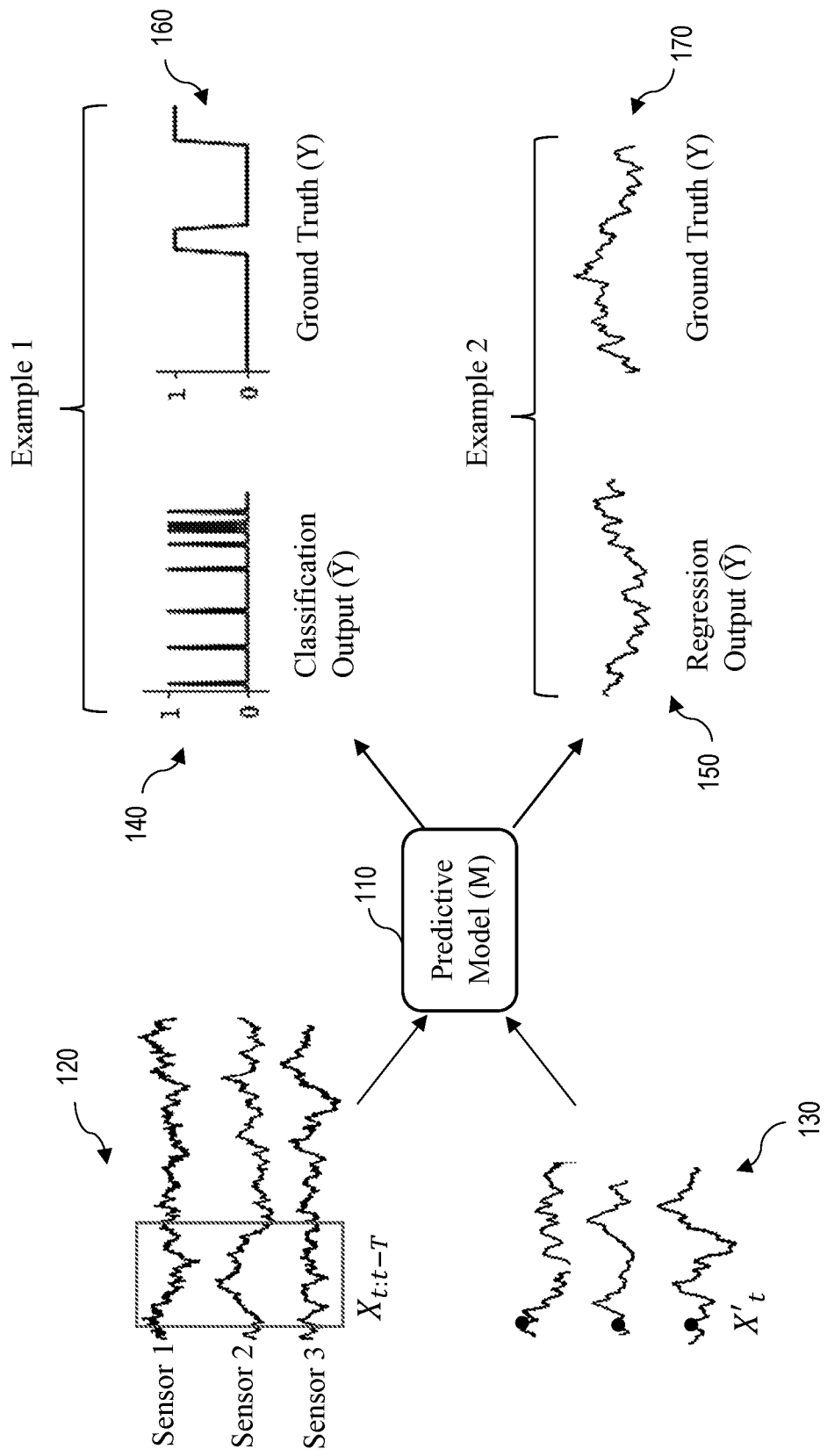
FIG. 1 is a diagram illustrating a problem setting of a predictive model, in accordance with one embodiment of the present invention.

An AI system includes input data, predictive model and parameters, model predictions, ground truth, and various types of drift functions to analyze the data elements and drift thresholds. FIG. 1 is a diagram illustrating a problem setting of predictive model 110, in accordance with one embodiment of the present invention. Input sensor data (X) 120 is generated in periodic interval from multiple sensors installed in various assets and operations. Feature extracted data (X') 130 is prepared from timeseries of input sensor data (X) 120 using feature extraction techniques. Predictive model or AI model (M) 110 may use either input sensor data (X) 120 or feature extracted data (X') 130 for training. Predictive model or AI model (M) 110 is trained on input sensor data (X) 120 or feature extracted data (X') 130 and outputs predictions ($\hat{Y}$) 140 in example 1 and/or predictions ($\hat{Y}$) 150 in example 2 for all the subsequent input data. In example 1, predictions ($\hat{Y}$) 140 is classification output; in example 2, predictions ($\hat{Y}$) 150 is regression output. In example 1, ground truth (Y) 160 is available for predictive model (M) 110; in example 2, ground truth (Y) 170 is available for predictive model (M) 110.

The AI system has following drifts. The data drift is a drift in input data. The analysis of the data drift requires only the input data, e.g., timeseries of input sensor data (X) 120 or feature extracted data (X') 130. The concept drift is a drift in target labels (e.g., ground truth (Y) 160 or ground truth (Y) 170) or the relationship between target labels and input data. The model drift is a drift in predictions of predictive model or AI model (M) 110, the relationship between the predictions (e.g., predictions ($\hat{Y}$) 140 and/or predictions ($\hat{Y}$) 150) and the target labels, or the relationship between the input data, the predictions, and the target labels. The analysis of the model drift may include comparison of model parameters or optimization parameters emitted during model preparation. A client model (such as predictive model (M) 110) is required in order to analyze the model drift.

Although the data drift, the concept drift, and the model drift have been explored individually, an automated system, which simultaneously considers all these drift types to perform retraining, does not exist. The data drift has been studied without analyzing model quality. In the data drift driven adaptive retraining, if the drift in input data is identified, a predictive model is retrained anticipating a drift in model performance. The data drift driven adaptive retraining has following drawbacks: (1) The predictive model is retrained without confirming a drift in model predictions. (2) A drift in ground truth (or the concept drift) is not addressed. (3) There is no mechanism to accommodate multiple drift functions from other drift types. Although multiple definitions of the concept drift exist, concept drift driven adaptive retraining, in majority of the cases, is to analyze the target variable. Drawbacks of the concept drift driven adaptive retraining are as follows: (1) The concept drift alone is not the reason for model degradation. (2) There is no mechanism to accommodate multiple drift functions from other drift types. In the quality driven adaptive retraining, model quality is observed over a time period and the abrupt model drift is identified using moving average techniques. In identifying the model quality, model predictions against ground truth are analyzed. The quality driven adaptive retraining has following drawbacks: (1) The reason for the model drift is not explained. (2) There is no mechanism to accommodate multiple drift functions. (3) There is no mechanism or method to anticipate possible model degradation prior to happening. (4) The drift in ground truth (or the concept drift) is not addressed as well.

Embodiments of the present invention disclose a system and method for quantifying different types of drifts in training artificial intelligence (AI) models, e.g., the data drift, the concept drift, and the model drift, using proper drift functions/algorithms. The disclosed system and method detect the drifts and notify users to retrain the AI models when required, using combined analysis of the above drifts. The disclosed system and method select appropriate data required for retraining using the above analysis and perform retraining of the AI model.

In embodiments of the present invention, the disclosed system and method train a model on given training data, deploy the model in production, monitor the model over the time, and retrain the model as required. The disclosed system comprises two major modules: a model training module and an adaptive retraining module. The disclosed system and method are implemented on one or more computing devices or servers. A computing device or server is described in more detail in later paragraphs with reference to FIG. 8. The disclosed system and method may be implemented in a cloud computing environment. The cloud computing environment is described in more detail in later paragraphs with reference to FIG. 9 and FIG. 10.

The model training module trains and deploys a predictive model or AI model. From a pool of pre-selected models, the model training module chooses a best model suitable for a given dataset and a problem, using manual analysis or automated selection such as optimization-based selection and grid search. The model training module determines model parameters for the best model, using hyperparameter search. The model training module trains the best model using training data and ground truth. Part of the training data may be used as validation data. The model training module deploys the best model in production. Test data is scored using the deployed best model and predictions are obtained by the model training module. The deployed best model is selected to be monitored by the adaptive retrain module. The implementation of the adaptive retrain module includes two phases: phase 1—computing retraining score, and phase 2—identifying required retraining data and creating a new AI model.

Embodiments of the present invention disclose an automated system that perform adaptive retraining by analyzing the data drift, the concept drift, and the model drift together. In embodiments of the present invention, an overall drifting score or a retraining score, which considers the relationship between the data drift, the concept drift, and the model drift, is computed. Embodiments of the present invention develop a 3-level drift scoring technique. First, a score for each drift function that resembles magnitude of change occurred in the data is computed. Second, a score for each of the data drift, the concept drift, and the model drift by aggregation of scores from the respective drift functions. Third, the overall drift score (or the retraining score) is computed by considering the second-level scores, i.e., an aggregated data drift score, an aggregated concept drift score, and an aggregated model drift score. Embodiments of the present invention select appropriate retraining data by a combination of sampling and relabeling techniques, based on the 3-level drift scores. Embodiments of the present invention allow users to take an informed decision in automated manner using combined analysis of data, concept, and model drifts.

In embodiments of the present invention, any algorithm which is used to identify a drift in input data, a drift in ground truth, a drift in model predictions, or relationship among them is called a drift function. Based on the type of data that the algorithm considers, the drift function is categorized into one of the categories: the data drift functions, the concept drift functions, and the model drift functions. The proposed system and method re-categorize all the available drift functions $f_1, f_2, f_3, \ldots f_n$ into data drift functions, concept drift functions, and model drift functions as per drift definitions. Drift thresholds, including a drift threshold ($\tau_{f_i}$) for a drift function $f_i$, a data drift threshold ($\tau_{dd}$), a concept drift threshold ($\tau_{cd}$), and a model drift threshold ($\tau_{md}$), can be set either by predefined values or by users.

In computation of the 3-level drift scores, the inputs include a batch of test data, model predictions, and ground truth. The outputs in the first-level drift score computation include a drift magnitude score ($s_{f_i}$) and a drift flag $\zeta_{f_i}$ for a drift function $f_i$ (i=1, ..., n). The outputs in the second-level drift score computation include an aggregated data drift score ($s_{dd}$) and its drift flag ($\zeta_{dd}$), an aggregated concept drift score ($s_{cd}$) and its drift flag ($\zeta_{cd}$), and an aggregated model drift score ($\zeta_{md}$) and its drift flag ($\zeta_{md}$). The outputs in the third-level drift score computation include a retraining score (s) and a retraining flag $\zeta$. The retraining score (s) may also called as an overall drift score or a total drift score. In computation of the 3-level drift scores, the data elements from the model training phase, i.e., training data, validation data, model predictions for training or validation data, ground truth, model parameters, optimization statistics, etc., can be used as a base in the adaptive retrain module. Computation of the 3-level drift scores will be discussed in detail in later paragraphs of this document.

In the third-level drift score computation in phase 1 (computing retrain score) mentioned above, the retraining score (s) and retraining flag $\zeta$ are obtained. Based on the retraining score (s) and retraining flag $\zeta$, the disclosed system and method determine whether retraining of predictive model or AI model is required. If the retraining flag $\zeta$ is true, the disclosed system and method perform the retraining.

In the second-level drift score computation in phase 1 (computing retrain score) mentioned above, the aggregated data drift score ($s_{dd}$), the data drift flag ($\zeta_{dd}$), the aggregated concept drift score ($s_{cd}$), the concept drift flag ($\zeta_{cd}$), the aggregated model drift score ($s_{md}$), and the model drift flag ($\zeta_{cd}$) are obtained. In response to determining that the data drift flag ($\zeta_{dd}$) is true, the disclosed system and method determines that the data drift is present. In response to determining that the concept drift flag ($\zeta_{cd}$) is true, the disclosed system and method determines that the concept drift is present. In response to determining that the model drift flag ($\zeta_{cd}$) is true, the disclosed system and method determine that the model drift is present.

In phase 2 (identifying required retraining data and creating a new AI model) mentioned above, in response to determining that the data drift is present, the disclosed system and method select new training data from the drifted period using known sampling techniques. In response to determining that the data drift is not present, the disclosed system and method use the original training data. Different strategies can be used to prepare new training data from the drifted period.

In phase 2 (identifying required retraining data and creating a new AI model) mentioned above, in response to determining that the concept drift is present, the disclosed system and method apply known relabeling techniques on the selected training data. The disclosed system and method may take new label definitions as inputs or deduce new label definitions from the drifted data.

In phase 2 (identifying required retraining data and creating a new AI model) mentioned above, in response to determining that the model drift is present and either the concept drift or the data drift is present, model selection is ignored by the disclosed system and method. Otherwise, the disclosed system and method perform model selection to select a new AI model. Finally, hyperparameter search is performed on the selected new AI model.

The disclosed system and method may replace the previously deployed AI model with the new AI model. Alternatively, the disclosed system and method may compare both the previously deployed AI model with the new AI model against each other using drift results over future period of data, and then the disclosed system and method select a winner as the production model.

Computation of the first-level drift scores is as follows. A drift function $f_i$ has a threshold $\tau_{f_i}(>0)$ set to either a user provided value or a default value. $f_i$ computes metrics for a given batch of data either by comparing against training data or by comparing against recent data over a window or any other means. Example of a metric is standard deviation (std). Finally, a drift magnitude score ($s_{f_i}$) and a drift flag ($\zeta_{f_i}$) is computed for $f_i$. For example, the drift magnitude score ($s_{f_i}$) and drift flag ($\zeta_{f_i}$) are computed by $$s_{f_i} = \frac{|std_{test} - std_{train}|}{std_{train} \tau_{f_i}}; s_{f_i} > 0 \tag{1}$$

$$\zeta_{f_i} = \begin{cases} \text{True, if } s_{f_i} \geq 1 \\ \text{False, otherwise} \end{cases} \tag{2}$$

The drift magnitude score ($s_{f_i}$) and drift flag ($\zeta_{f_i}$) are computed for all data drift functions, concept drift functions, and model drift functions $f_1, f_2, f_3, \ldots f_n$.

Computation of the second-level drift scores is as follows. Each of the data drift, the concept drift, and the model drift has at least one drift function. The data drift, the concept drift, and the model drift have thresholds $\tau_{dd}$, $\tau_{cd}$, and $\tau_{md}$, respectively; the thresholds can be set either by predefined values or by users. For example, the data drift has drift function $f_1, f_2, \ldots f_m$ which evaluate either univariate or multivariate input data. The aggregated data drift score ($s_{dd}$) and the data drift flag ($\zeta_{dd}$) are computed from drift magnitude scores and drift flags corresponding to all the data drift functions $f_1, f_2, \ldots f_m$. For example, the aggregated data drift score ($s_{dd}$) and the data drift flag ($\zeta_{dd}$) are computed by $$s_{dd} = \begin{cases} \frac{\sum_{i=1, \forall \zeta_{f_i}=True}^{m} s_{f_i}}{m}, \text{ if } \sum_{i=1, \forall \zeta_{f_i}=True}^{m} s_{f_i} < m \\ 1, \text{ otherwise} \end{cases} ; 0 < s_{dd} < 1 \tag{3}$$

$$\zeta_{dd} = \begin{cases} \text{True, if } s_{dd} \geq \tau_{dd} \\ \text{False, otherwise} \end{cases} \tag{4}$$

The aggregated concept drift score ($s_{cd}$), the concept drift flag ($\zeta_{cd}$), the aggregated model drift score ($s_{md}$), and model drift flag ($\zeta_{md}$) are computed in a similar way as the aggregated data drift score ($s_{dd}$) and the data drift flag ($\zeta_{dd}$).

Computation of the third-level drift scores is as follows. The retraining score or overall drift score (s) and the retraining flag $\zeta$ are computed based on the aggregated data drift score ($s_{dd}$) and its drift flag ($\zeta_{dd}$), the aggregated concept drift score ($s_{cd}$) and its drift flag ($\zeta_{cd}$), and the aggregated model drift score ($s_{md}$) and its drift flag ($\zeta_{md}$). The aggregated data drift score ($s_{dd}$), the aggregated concept drift score ($s_{cd}$), and the aggregated model drift score ($s_{md}$)

can be aggregated values over a period. An example of aggregation is the average of the values. For example, the retraining score or overall drift score (s) and the retraining flag $\zeta$ are computed by $$r_{dd} = \frac{s_{dd}}{\tau_{dd}} \quad (5)$$

$$r_{cd} = \frac{s_{cd}}{\tau_{cd}} \quad (6)$$

$$r_{md} = \frac{s_{md}}{\tau_{md}} \quad (7)$$

$$s = \begin{cases} r_{md}r_{cd}, & \text{if } r_{dd} < 1 \text{ and } r_{cd} \geq 1. \\ r_{md}r_{dd}, & \text{if } r_{cd} < 1 \text{ and } r_{md} \geq 1. \\ r_{md}r_{cd}r_{dd}, & \text{if } r_{cd} \geq 1 \text{ and } r_{dd} \geq 1. \\ r_{md}, & \text{otherwise} \end{cases} ; s > 0 \quad (8)$$

$$s = \min(s, 1) \quad (9)$$

$$\zeta = \begin{cases} \text{True, if } s = 1. \\ \text{False, otherwise} \end{cases} \quad (10)$$

The above computation is deduced from an approximated relationship between various kinds of drifts.

Figure 2:
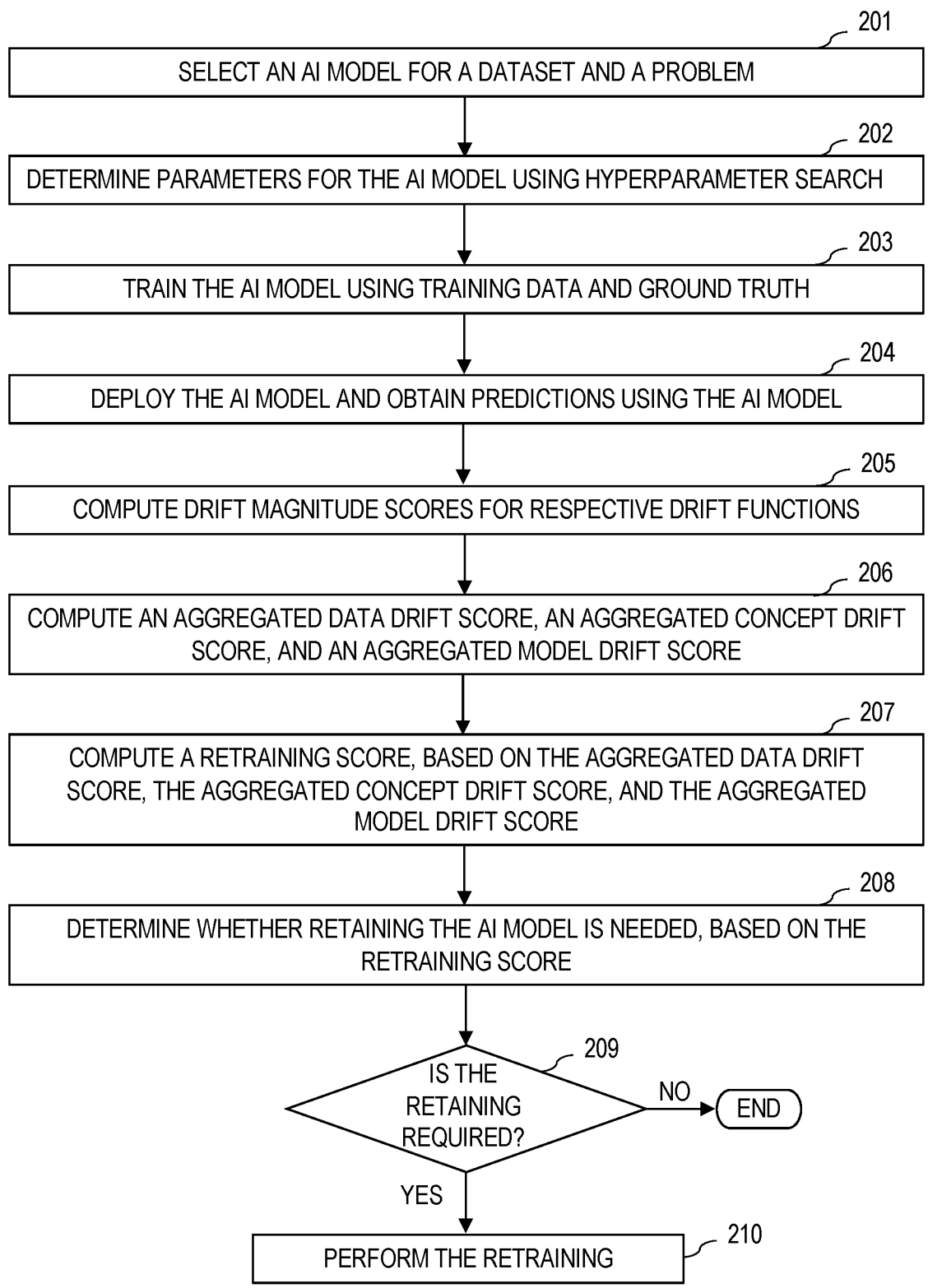
FIG. 2 is a flowchart showing operational steps of adaptive retraining of an artificial intelligence model by detecting a data drift, a concept drift, and a model drift, in accordance with one embodiment of the present invention.

FIG. 2 is a flowchart showing operational steps of adaptive retraining of an artificial intelligence model by detecting a data drift, a concept drift, and a model drift, in accordance with one embodiment of the present invention. The operational steps presented in FIG. 2 are implemented by the disclosed system which is hosted by one or more computing devices or servers. A computing device or server is described in more detail in later paragraphs with reference to FIG. 8. The operational steps presented in FIG. 2 may be implemented in a cloud computing environment. The cloud computing environment is described in more detail in later paragraphs with reference to FIG. 9 and FIG. 10.

At step 201, the one or more computing devices or servers select an artificial intelligence (AI) model for a dataset and a problem. From a pool of pre-selected models, the one or more computing devices or servers choose a best model suitable for the given dataset and the problem. At step 202, the one or more computing devices or servers determine parameters for the AI model using hyperparameter search. At step 203, the one or more computing devices or servers train the AI model using training data and ground truth. At step 204, the one or more computing devices or servers deploy the AI model and obtain predictions using the AI model. Steps 201-204 are operational steps in the model training phase. The data elements from the model training phase, including training data, validation data, model predictions for training or validation data, ground truth, model parameters, and optimization statistics, can be used to compute 3-level drift scores in the following steps.

At step 205, the one or more computing devices or servers compute drift magnitude scores for respective drift functions. Drift functions $f_1, f_2, f_3, \ldots f_n$ are available, each of which is an algorithm used to identify a drift in input data, a drift in ground truth, a drift in model predictions, or a relationship among them. The one or more computing devices or servers categorize all the available drift functions $f_1, f_2, f_3, \ldots f_n$ into data drift functions, concept drift functions, and model drift functions. For a drift function $f_1$, the one or more computing devices or servers compute a drift magnitude score ($s_{f_i}$), using equation 1 described in a previous paragraph in this document. For a drift function $f_i$, the one or more computing devices or servers also compute a drift flag ($\zeta_{f_i}$), using equation 2 described in a previous paragraph in this document. At step 205, the one or more computing devices or servers compute the first-level drift scores.

At step 206, the one or more computing devices or servers compute an aggregated data drift score, an aggregated concept drift score, and an aggregated model drift score. Based on the drift magnitude score ($s_{f_i}$) and the drift flag ($\zeta_{f_i}$) (the first-level drift scores) computed at step 205, the one or more computing devices or servers compute the aggregated data drift score ($s_{dd}$), using equation 3 described in a previous paragraph in this document. The one or more computing devices or servers at step 206 also compute the data drift flag ($\zeta_{dd}$), using equation 4 described in a previous paragraph in this document, based on the aggregated data drift score ($s_{dd}$) and a predetermined threshold ($\tau_{dd}$) of the data shift. Similarly, at step 206, the one or more computing devices or servers compute the aggregated concept drift score ($s_{cd}$), the concept drift flag ($\zeta_{cd}$), the aggregated model drift score ($s_{md}$), and model drift flag ($\zeta_{cd}$). At step 206, the one or more computing devices or servers compute the second-level drift scores.

At step 207, the one or more computing devices or servers compute a retraining score (or an overall drift score), based on the aggregated data drift score, the aggregated concept drift score, and the aggregated model drift score. Based on the aggregated data drift score ($s_{dd}$), the aggregated concept drift score ($s_{cd}$), and aggregated model drift score ($s_{md}$) that are computed at step 206, and also based on the predetermined threshold ($\tau_{dd}$) of the data shift, the predetermined threshold ($\tau_{cd}$) of the concept shift, and the predetermined threshold (rind) of the model drift, the one or more computing devices or servers compute the retraining score or overall drift score (s), using equations 5-9 described in a previous paragraph in this document. At step 207, the one or more computing devices or servers also compute a retraining flag ($\zeta$), using equation 10 described in a previous paragraph in this document. At step 207, the one or more computing devices or servers compute the third-level drift scores.

At step 208, the one or more computing devices or servers determine whether retaining of the AI model is required, based on the retraining score (the retraining score may also called as an overall drift score or a total drift score). To determine whether the retaining of the AI model is required, the one or more computing devices or servers determines whether the retraining flag $\zeta$ is true or false. The retraining score or overall drift score (s) and retraining flag $\zeta$ have been computed at step 207 by the one or more computing devices or servers.

In response to determining that the retaining the AI model is not required (NO branch of decision block 209), the one or more computing devices or servers does not perform the retraining of the AI model. In other words, in response to determining that the retraining flag $\zeta$ is false, the one or more computing devices or servers will not take any action to retrain the AI model.

In response to determining that retaining the AI model is required (YES branch of decision block 209), at step 210, the one or more computing devices or servers perform the retraining of the AI model. In other words, in response to determining that the retraining flag $\zeta$ is true, the one or more computing devices or servers perform the retraining.

Figure 3:
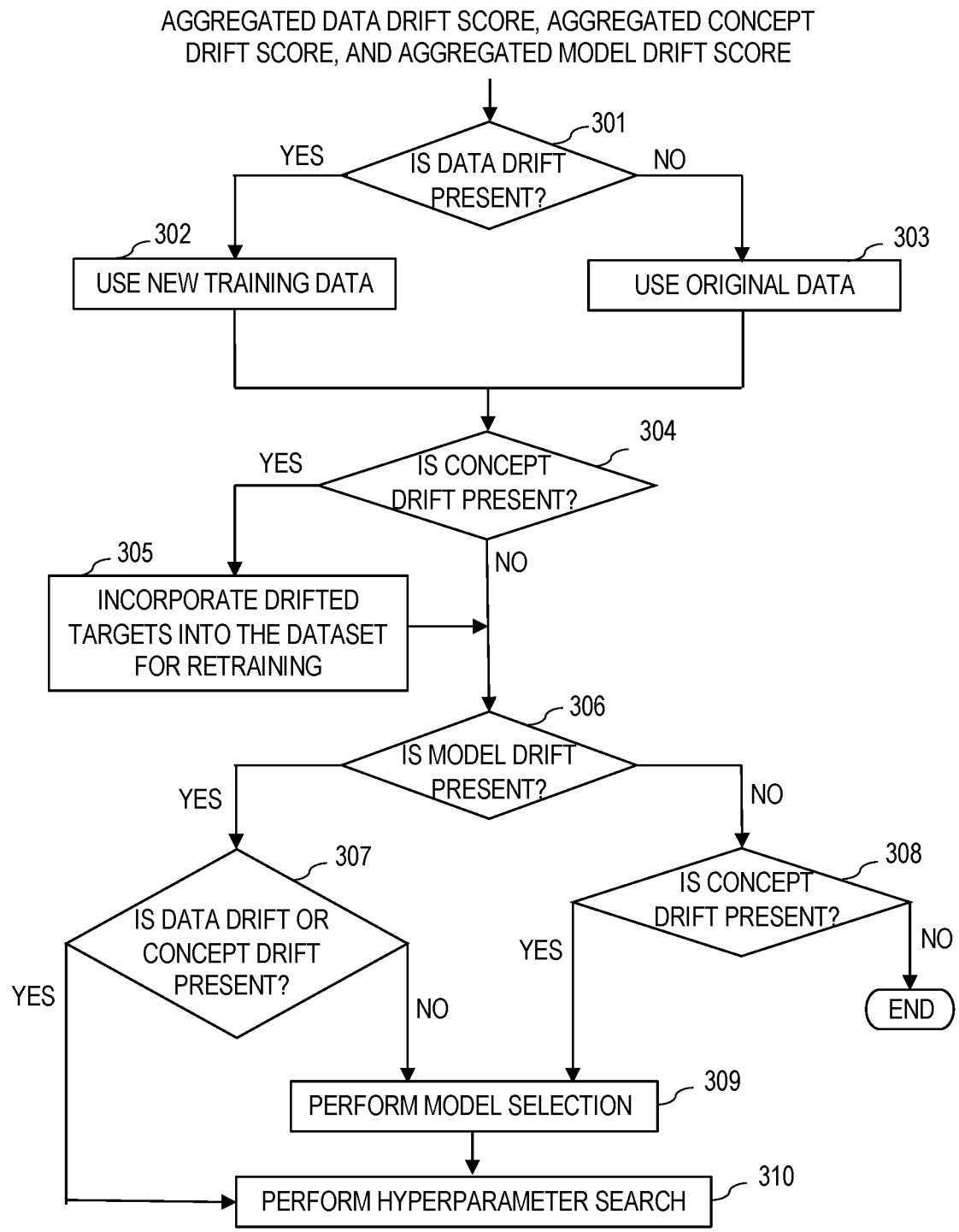
FIG. 3 is a flowchart showing operational steps of adaptive retraining of an artificial intelligence model by detecting a data drift, a concept drift, and a model drift, in accordance with another embodiment of the present invention.

FIG. 3 is a flowchart showing operational steps of adaptive retraining of an artificial intelligence model by detecting a data drift, a concept drift, and a model drift, in accordance with another embodiment of the present invention. The operational steps presented in FIG. 3 are implemented by the disclosed system which is hosted by one or more computing devices or servers. A computing device or server is described in more detail in later paragraphs with reference to FIG. 8. The operational steps may be implemented in a cloud computing environment. The cloud computing environment is described in more detail in later paragraphs with reference to FIG. 9 and FIG. 10.

The aggregated data drift score, aggregated concept drift score, and aggregated model drift score have been computed at step 206 by the one or more computing devices or servers. The aggregated data drift score, aggregated concept drift score, and aggregated model drift score are used for the operating steps presented in FIG. 3.

At step 301, the one or more computing devices or servers determine whether the data drift is present. To determine whether the data drift is present, the one or more computing devices or servers determine whether the data drift flag ($\zeta_{dd}$) (which is computed at step 206) is true or false. If the data drift flag ($\zeta_{dd}$) is true, the data drift is present; if the data drift flag ($\zeta_{dd}$) is false, the data drift is not present.

In response to determining that the data drift is present or the data drift flag ($\zeta_{dd}$) is true (YES branch of decision block 301), at step 302, the one or more computing devices or servers use new training data for the retraining of the AI model. The new training data may be an entirely new training dataset. The new training data may be combination of the drifted training data and non-drifted training data (or the one or more computing devices or servers incorporate the drifted training data into new data). Selecting the new training data from the drifted period uses known sampling techniques.

In response to determining that the data drift is not present or the drift flag ($\zeta_{dd}$) is false (NO branch of decision block 301), at step 303, the one or more computing devices or servers use original data which has been used in the model training phase.

After either step 302 or step 303, the one or more computing devices or servers at step 304 determine whether the concept drift is present. To determine whether the concept drift is present, the one or more computing devices or servers determine whether the concept drift flag ($\zeta_{cd}$) (which is computed at step 206) is true or false. If the concept drift flag ($\zeta_{dd}$) is true, the concept drift is present; if the concept drift flag ($\zeta_{cd}$) is false, the concept drift is not present.

In response to determining that the concept drift is present or the concept drift flag ($\zeta_{cd}$) is true (YES branch of decision block 304), at step 305, the one or more computing devices or servers incorporate drifted targets into a dataset for the retraining of the AI model.

In response to determining that the concept drift is not present or the concept drift flag ($\zeta_{cd}$) is false (NO branch of decision block 304), at step 306, the one or more computing devices or servers determine whether the model drift is present. To determine whether the model drift is present, the one or more computing devices or servers determine whether the model drift flag ($\zeta_{cd}$) (which is computed at step 206) is true or false. If the model drift flag ($\zeta_{cd}$) is true, the model drift is present; if the model drift flag ($\zeta_{cd}$) is false, the model drift is not present.

In response to determining that the concept drift is present or the model drift flag ($\zeta_{cd}$) is true (YES branch of decision block 306), at step 307, the one or more computing devices or servers determine whether either data drift or the concept drift is present. In response to determining that the concept drift is not present or the model drift flag ($\zeta_{cd}$) is false (NO branch of decision block 306), at step 308, the one or more computing devices or servers determine whether the concept drift is present.

In response to determining that one of the data drift and the concept drift is present (YES branch of decision block 307), the one or more computing devices or servers at step 310 perform hyperparameter search. In response to determining that neither the data drift nor the concept drift is present (NO branch of decision block 307), the one or more computing devices or servers at step 309 perform model selection and then perform hyperparameter search.

In response to determining that the concept drift is present (YES branch of decision block 308), the one or more computing devices or servers at step 309 perform model selection and then perform hyperparameter search. In response to determining that the concept drift is not present (NO branch of decision block 308), the one or more computing devices or servers will not take any action to retrain the AI model.

FIG. 4 illustrates an example of relationships between a data drift score, a concept drift score, a model drift score, and an overall drift score, in accordance with another embodiment of the present invention. As shown in the first row in FIG. 4, when a data drift, a concept drift, and a model drift are present (i.e., data drift flag ($\zeta_{dd}$), concept drift flag ($\zeta_{cd}$), and model flag ($\zeta_{md}$) are true) and when the overall drift score (which is calculated based on the aggregated data drift score, the aggregated concept drift score, the aggregated model drift score) indicates that retraining is required, the disclosed system and method incorporate drifted input data and drifted targets into new training data, and the disclosed system and method perform hyperparameter search.

As shown in the second row in FIG. 4, when a data drift and a concept drift are present (i.e., data drift flag ($\zeta_{dd}$) and concept drift flag ($\zeta_{cd}$) are true), when a model drift is not present (model drift flag ($\zeta_{md}$) is false), and when the overall drift score indicates that retraining is required, the disclosed system and method incorporate drifted input data and drifted targets into new training data, the disclosed system and method perform new model selection.

As shown in the third row in FIG. 4, when a data drift and a model drift are present (i.e., data drift flag ($\zeta_{dd}$) and model drift flag ($\zeta_{md}$) are true), when a concept drift is not present (concept drift flag ($\zeta_{cd}$) is false), and when the overall drift score indicates that retraining is required, the disclosed system and method incorporate drifted input data into new training data and perform hyperparameter search.

As shown in the fourth row in FIG. 4, when a data drift is not present (data drift flag ($\zeta_{dd}$) is false), when a concept drift and a model drift are present (concept drift flag ($\zeta_{cd}$), and model drift flag ($\zeta_{md}$) are true), and when the overall drift score indicates that retraining is required, the disclosed system and method incorporate drifted targets into new training data and perform hyperparameter search.

As shown in the fifth row in FIG. 4, when a data drift and a model drift are not present (i.e., data drift flag ($\zeta_{dd}$) and model flag ($\zeta_{md}$) are false), when a concept drift is present (concept drift flag ($\zeta_{cd}$) is true), and when the overall drift score indicates that retraining is required, the disclosed system and method perform new model selection and retrain the new model with new training data along with target relabeling.

As shown in the sixth row in FIG. 4, when a data drift and a concept drift are not present (i.e., data drift flag ($\zeta_{dd}$) and concept flag ($\zeta_{cd}$) are false), when a model drift is present (model drift flag ($\zeta_{md}$) is true), and when the overall drift score indicates that retraining is required, it is indicated that the present deployed model may not be robust. Therefore, the disclosed system and method perform new model selection; for example, the disclosed system and method select a different model from pipeline optimization.

As shown in the seventh row in FIG. 4, when a data drift is present (i.e., data drift flag ($\zeta_{dd}$) is true), when a concept drift and a model drift are not present (concept drift flag ($\zeta_{cd}$) and model drift flag ($\zeta_{md}$) are false), and when the overall drift score indicates that retraining is not required, the disclosed system and method issue a warning of the data drift.

As shown in the eighth row in FIG. 4, when a data drift, a concept drift, and a model drift are not present (i.e., data drift flag ($\zeta_{dd}$), concept drift flag ($\zeta_{cd}$), and model flag ($\zeta_{md}$) are false) and when the overall drift score indicates that retraining is not required, it is indicated that the currently deployed model is in a good shape. Therefore, the disclosed system and method do not take any action for adaptive retraining.

Figure 5:
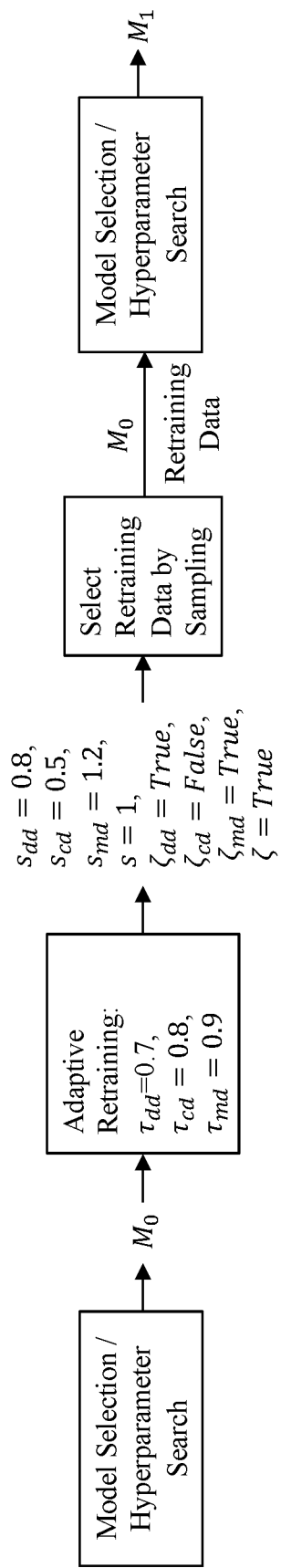
FIG. 5 is a diagram illustrating a first example of adaptive retraining of an artificial intelligence model by detecting a data drift, a concept drift, and a model drift, in accordance with another embodiment of the present invention.

FIG. 5 is a diagram illustrating a first example of adaptive retraining of an artificial intelligence model by detecting a data drift, a concept drift, and a model drift, in accordance with another embodiment of the present invention. An AI model $M_0$ is trained on a historic training data, by using model selection and hyperparameter search. $M_0$ is deployed and configured for adaptive retraining with following thresholds: data drift threshold $\tau_{dd}=0.7$, concept drift threshold $\tau_{cd}=0.8$, and model drift threshold $\tau_{md}=0.9$. Upon arrival of the first batch of production data and when ground truth is available, drift algorithms are applied on the model $M_0$ and the data. The drift scores are computed and obtained as follows: aggregated data drift score $s_{dd}=0.8$, aggregated concept drift score $s_{cd}=0.5$, aggregated model drift score $s_{md}=1.2$, and overall drift score (or retraining score) $s=1$. Further, the computation of drift scores gives data drift flag $\zeta_{dd}$=True, concept drift flag $\zeta_{cd}$=False, model drift flag $\zeta_{md}$=True, and retraining flag $\zeta$=True. Based on the drift scores and drift flags, $M_0$ is set to retrain and new train data is selected using known sampling techniques. A new AI model $M_1$ is created after hyperparameter search.

Figure 6:
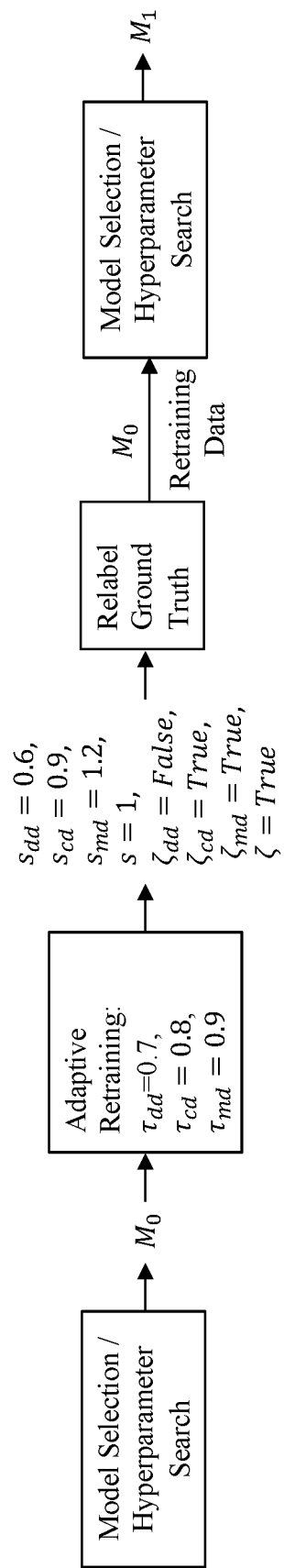
FIG. 6 is a diagram illustrating a second example of adaptive retraining of an artificial intelligence model by detecting a data drift, a concept drift, and a model drift, in accordance with another embodiment of the present invention.

FIG. 6 is a diagram illustrating a second example of adaptive retraining of an artificial intelligence model by detecting a data drift, a concept drift, and a model drift, in accordance with another embodiment of the present invention. An AI model $M_0$ is trained on a historic training data, by using model selection and hyperparameter search. $M_0$ is deployed and configured for adaptive retraining with following thresholds: data drift threshold $\tau_{dd}=0.7$, concept drift threshold $\tau_{cd}=0.8$, and model drift threshold $\tau_{md}=0.9$. Upon arrival of the first batch of production data and when ground truth is available, drift algorithms are applied on the model $M_0$ and the data. The drift scores are computed and obtained as follows: aggregated data drift score $s_{dd}=0.6$, aggregated concept drift score $s_{cd}=0.9$, aggregated model drift score $s_{md}=1.2$, and overall drift score (or retraining score) $s=1$. Further, the computation of drift scores gives data drift flag $\zeta_{dd}$=False, concept drift flag $\zeta_{cd}$=True, model drift flag $\zeta_{md}$=True, and retraining flag $\zeta$=True. Based on the drift scores and drift flags, $M_0$ is set to retrain and new train data is selected after relabeling the ground truth as per new definitions. A new AI model $M_1$ is created after hyperparameter search.

Figure 7:
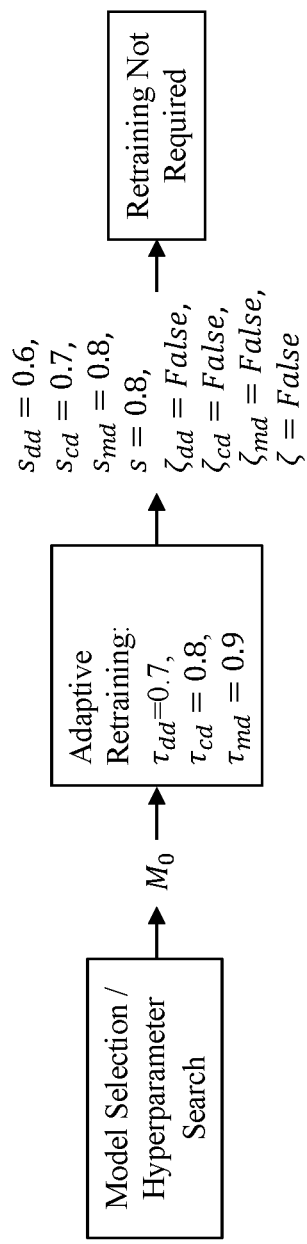
FIG. 7 is a diagram illustrating a third example of adaptive retraining of an artificial intelligence model by detecting a data drift, a concept drift, and a model drift, in accordance with another embodiment of the present invention.

FIG. 7 is a diagram illustrating a third example of adaptive retraining of an artificial intelligence model by detecting a data drift, a concept drift, and a model drift, in accordance with another embodiment of the present invention. An AI model $M_0$ is trained on a historic training data, by using model selection and hyperparameter search. $M_0$ is deployed and configured for adaptive retraining with following thresholds: data drift threshold $\tau_{dd}=0.7$, concept drift threshold $\tau_{cd}=0.8$, and model drift threshold $\tau_{md}=0.9$. Upon arrival of the first batch of production data and when ground truth is available, drift algorithms are applied on the model $M_0$ and the data. The drift scores are computed and obtained as follows: aggregated data drift score $s_{dd}=0.6$, aggregated concept drift score $s_{cd}=0.7$, aggregated model drift score $s_{md}=0.8$, and overall drift score (or retraining score) $s=0.8$. Further, the computation of drift scores gives data drift flag $\zeta_{dd}$=False, concept drift flag $\zeta_{cd}$=False, model drift flag $\zeta_{md}$=False, and retraining flag $\zeta$=False. Based on the drift scores and drift flags, retraining is not required.

Figure 8:
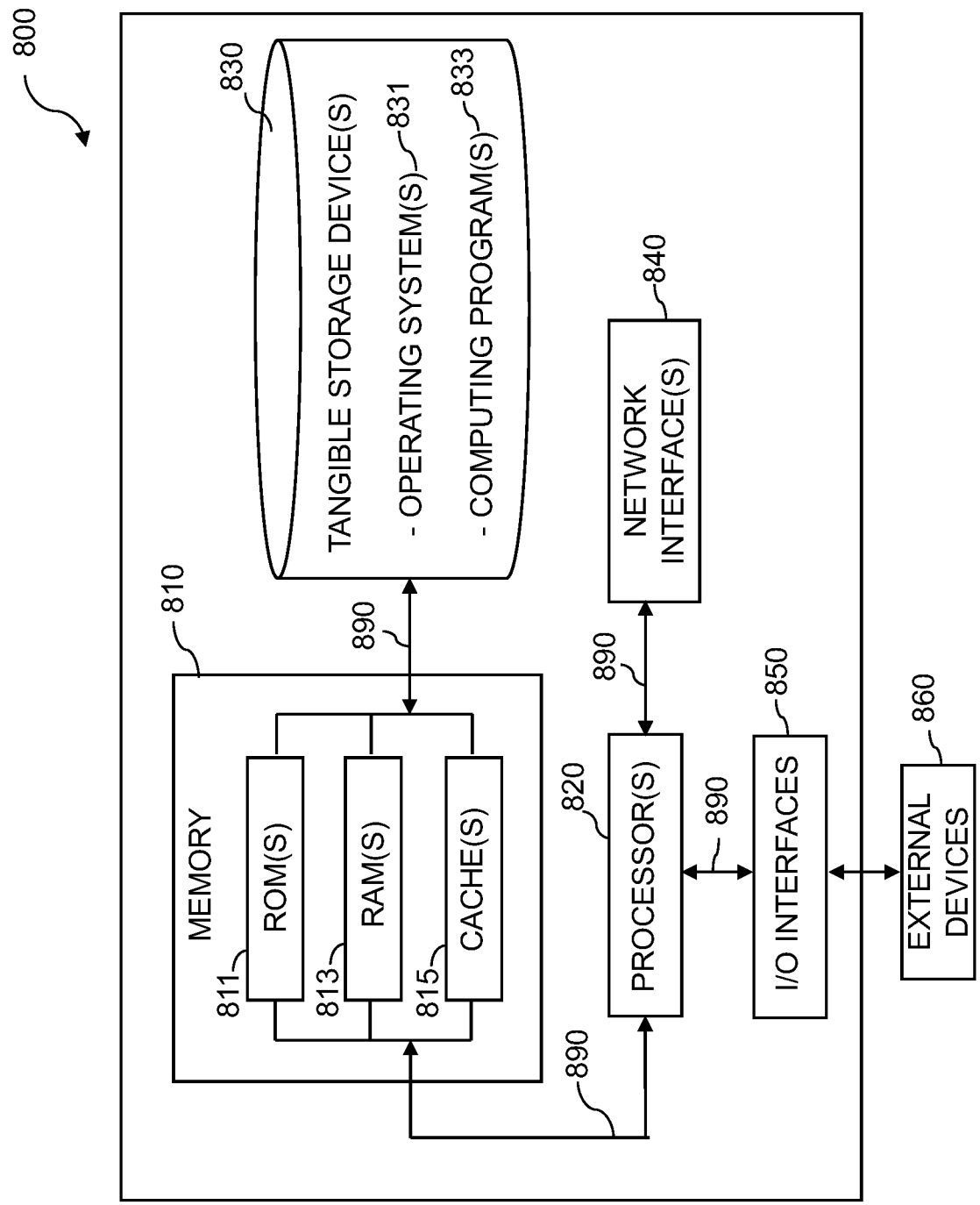
FIG. 8 is a diagram illustrating components of a computing device or server, in accordance with one embodiment of the present invention.

FIG. 8 is a diagram illustrating components of computing device or server 800, in accordance with one embodiment of the present invention, in accordance with one embodiment of the present invention. It should be appreciated that FIG. 8 provides only an illustration of one implementation and does not imply any limitations; different embodiments may be implemented.

Referring to FIG. 8, computing device or server 800 includes processor(s) 820, memory 810, and tangible storage device(s) 830. In FIG. 8, communications among the above-mentioned components of computing device or server 800 are denoted by numeral 890. Memory 810 includes ROM(s) (Read Only Memory) 811, RAM(s) (Random Access Memory) 813, and cache(s) 815. One or more operating systems 831 and one or more computer programs 833 reside on one or more computer readable tangible storage device(s) 830.

Computing device or server 800 further includes I/O interface(s) 850. I/O interface(s) 850 allows for input and output of data with external device(s) 860 that may be connected to computing device or server 800. Computing device or server 800 further includes network interface(s) 840 for communications between computing device or server 800 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
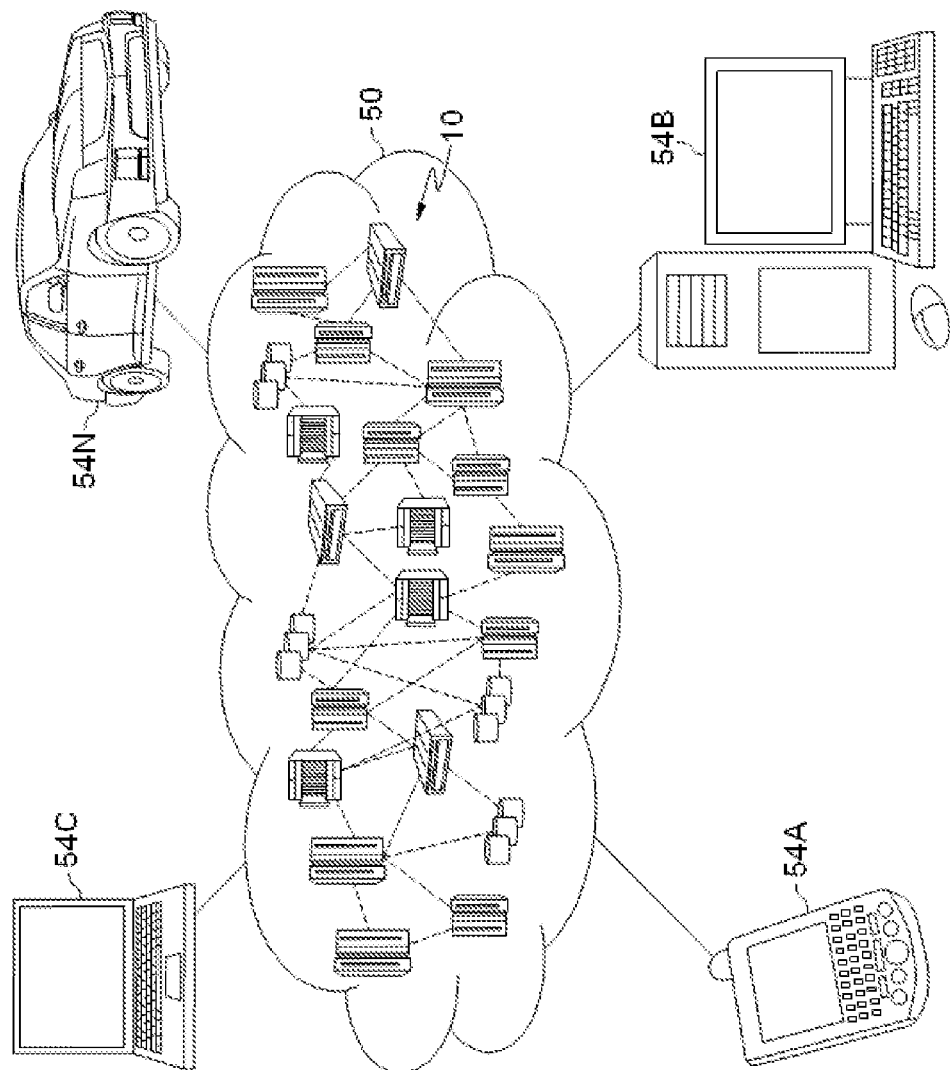
FIG. 9 depicts a cloud computing environment, in accordance with one embodiment of the present invention.

Referring now to FIG. 9, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 10:
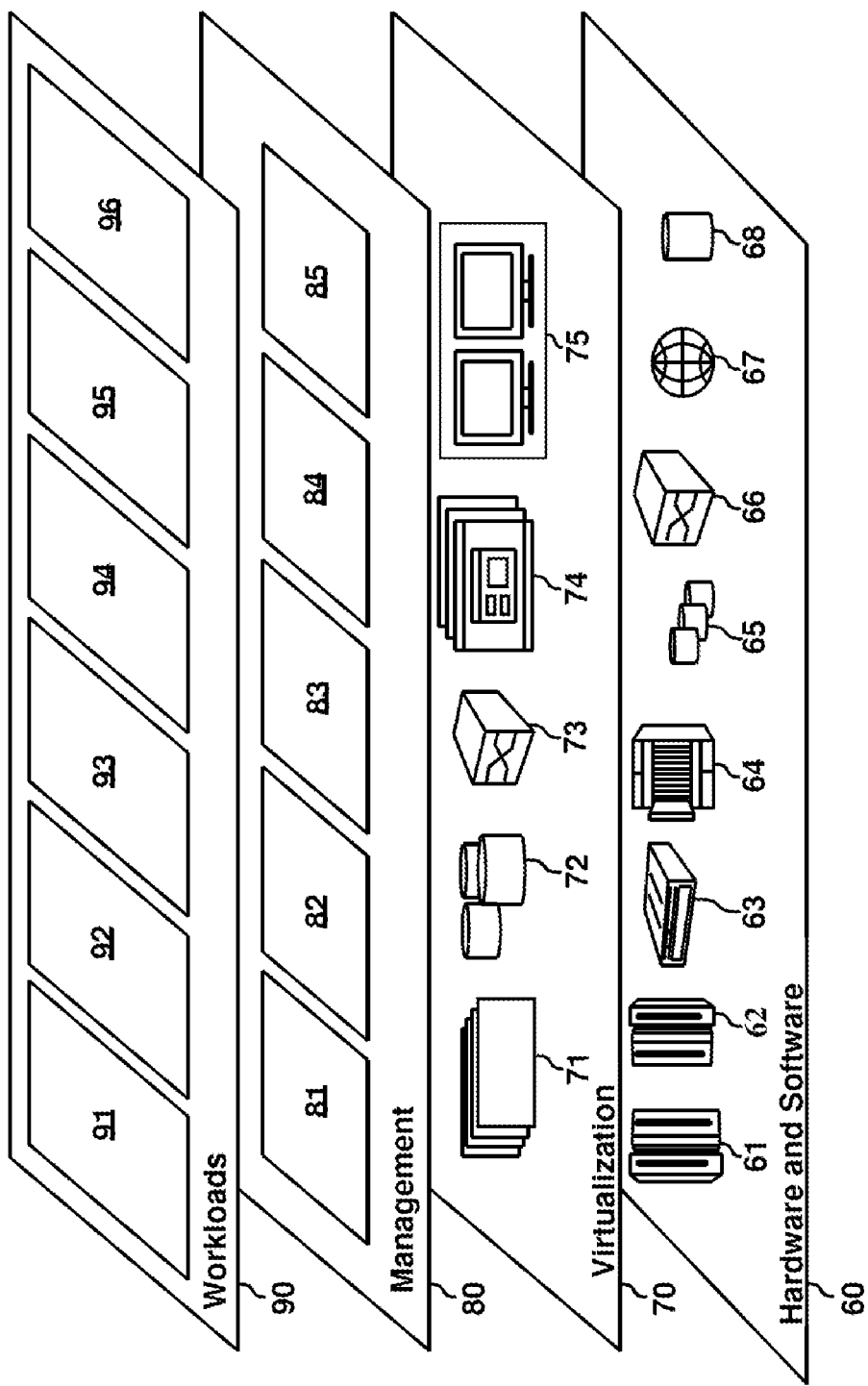
FIG. 10 depicts abstraction model layers in a cloud computing environment, in accordance with one embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and function 96. Function 96 in the present invention is the functionality of adaptive retraining of an artificial intelligence model by detecting data drift, concept drift, and model drift.

What is claimed is:

1. A computer-implemented method for adaptive retraining of an artificial intelligence model, the method comprising:
   computing drift magnitude scores for respective drift functions;
   computing an aggregated data drift score for a data drift, an aggregated concept drift score for a concept drift, and an aggregated model drift score for a model drift;
   computing an overall drift score, based on the aggregated data drift score, the aggregated concept drift score, the aggregated model drift score, a predetermined data drift threshold, a predetermined concept drift threshold, and a predetermined model drift threshold;
   determining whether retraining of the artificial intelligence model is required, based on the overall drift score to adapt the model to a changing data distribution; and
   performing the retraining of the artificial intelligence model, in response to determining the retraining of the artificial intelligence model is required, wherein the retraining of the artificial intelligence model comprises:
      creating a new AI model, wherein creating the new AI model comprises:
         selecting a new set of model parameters using hyperparameter search;
         training the new AI model using new training dataset based on the new set of model parameters; and
         retraining the new AI model to adapt to the changes in the data drift, concept drift, and model drift.

2. The computer-implemented method of claim 1, further comprising:
   computing a data drift flag based on the aggregated data drift score and the predetermined data drift threshold, a concept drift flag based on the aggregated concept drift score and the predetermined concept drift threshold, and a model drift flag based on the aggregated model drift score and the predetermined model drift threshold.

3. The computer-implemented method of claim 1, further comprising:
   determining whether the data drift is present, by determining whether a data drift flag is true or false;
   in response to determining that the data drift is present, using new training data to retrain the artificial intelligence model; and
   in response to determining that the data drift is not present, using original training data.

4. The computer-implemented method of claim 1, further comprising:
   determining whether the concept drift is present, by determining whether a concept drift flag is true or false; and
   in response to determining that the concept drift is present, incorporating drifted targets into a dataset for the retraining of the artificial intelligence model.

5. The computer-implemented method of claim 1, further comprising:
   determining whether the model drift is present, by determining whether a model drift flag is true or false;
   in response to determining that the model drift is present, determining whether either the data drift or the concept drift is present; and
   in response to determining that the model drift is not present, determining whether the concept drift is present.

6. The computer-implemented method of claim 5, further comprising:
   in response to determining that the model drift is present and determining that either the data drift or the concept drift is present, performing hyperparameter search in the retraining; and
   in response to determining that the model drift is present and determining that neither the data drift nor the concept drift is present, performing model selection to select a new artificial intelligence model and performing hyperparameter search in the retraining.

7. The computer-implemented method of claim 5, further comprising:
   in response to determining that the model drift is not present and determining that the concept drift is present, performing model selection to select a new artificial intelligence model and performing hyperparameter search in the retraining.

8. A computer program product for adaptive retraining of an artificial intelligence model, the computer program product comprising a computer readable storage medium having program instructions embodied therewith, the program instructions executable by one or more processors, the program instructions executable to:
   compute drift magnitude scores for respective drift functions;
   compute an aggregated data drift score for a data drift, an aggregated concept drift score for a concept drift, and an aggregated model drift score for a model drift;
   compute an overall drift score, based on the aggregated data drift score, the aggregated concept drift score, the aggregated model drift score, a predetermined data drift threshold, a predetermined concept drift threshold, and a predetermined model drift threshold;
   determine whether retraining of the artificial intelligence model is required, based on the overall drift score to adapt the model to a changing data distribution; and
   perform the retraining of the artificial intelligence model, in response to determining the retraining of the artificial intelligence model is required, wherein the retraining of the artificial intelligence model comprises:
      create a new AI model, wherein creating the new AI model comprises:
         select a new set of model parameters using hyperparameter search;
         train the new AI model using new training dataset based on the new set of model parameters; and
         retrain the new AI model to adapt to the changes in the data drift, concept drift, and model drift.

9. The computer program product of claim 8, further comprising the program instructions executable to:
   compute a data drift flag based on the aggregated data drift score and the predetermined data drift threshold, a concept drift flag based on the aggregated concept drift score and the predetermined concept drift threshold, and a model drift flag based on the aggregated model drift score and the predetermined model drift threshold.

10. The computer program product of claim 8, further comprising the program instructions executable to:
    determine whether the data drift is present, by determining whether a data drift flag is true or false;
    in response to determining that the data drift is present, use new training data to retrain the artificial intelligence model; and in response to determining that the data drift is not present, use original training data.

11. The computer program product of claim 8, further comprising the program instructions executable to:
   determine whether the concept drift is present, by determining whether a concept drift flag is true or false; and
   in response to determining that the concept drift is present, incorporate drifted targets into a dataset for the retraining of the artificial intelligence model.

12. The computer program product of claim 8, further comprising the program instructions executable to:
   determine whether the model drift is present, by determining whether a model drift flag is true or false;
   in response to determining that the model drift is present, determine whether either the data drift or the concept drift is present; and
   in response to determining that the model drift is not present, determine whether the concept drift is present.

13. The computer program product of claim 12, further comprising program instructions executable to:
   in response to determining that the model drift is present and determining that either the data drift or the concept drift is present, perform hyperparameter search in the retraining; and
   in response to determining that the model drift is present and determining that neither the data drift nor the concept drift is present, perform model selection to select a new artificial intelligence model and perform hyperparameter search in the retraining.

14. The computer program product of claim 12, further comprising the program instructions executable to:
   in response to determining that the model drift is not present and determining that the concept drift is present, perform model selection to select a new artificial intelligence model and perform hyperparameter search in the retraining.

15. A computer system for adaptive retraining of an artificial intelligence model, the computer system comprising one or more processors, one or more computer readable tangible storage devices, and program instructions stored on at least one of the one or more computer readable tangible storage devices for execution by at least one of the one or more processors, the program instructions executable to:
   compute drift magnitude scores for respective drift functions;
   compute an aggregated data drift score for a data drift, an aggregated concept drift score for a concept drift, and an aggregated model drift score for a model drift;
   compute an overall drift score, based on the aggregated data drift score, the aggregated concept drift score, the aggregated model drift score, a predetermined data drift threshold, a predetermined concept drift threshold, and a predetermined model drift threshold;
   determine whether retraining of the artificial intelligence model is required, based on the overall drift score to adapt the model to a changing data distribution; and
   perform the retraining of the artificial intelligence model, in response to determining the retraining of the artificial intelligence model is required, wherein the retraining of the artificial intelligence model comprises:
      create a new AI model, wherein creating the new AI model comprises:
         select a new set of model parameters using hyperparameter search;
         train the new AI model using new training dataset based on the new set of model parameters; and
         retrain the new AI model to adapt to the changes in the data drift, concept drift, and model drift.

16. The computer system of claim 15, further comprising the program instructions executable to:
   compute a data drift flag based on the aggregated data drift score and the predetermined data drift threshold, a concept drift flag based on the aggregated concept drift score and the predetermined concept drift threshold, and a model drift flag based on the aggregated model drift score and the predetermined model drift threshold.

17. The computer system of claim 15, further comprising the program instructions executable to:
   determine whether the data drift is present, by determining whether a data drift flag is true or false;
   in response to determining that the data drift is present, use new training data to retrain the artificial intelligence model; and
   in response to determining that the data drift is not present, use original training data.

18. The computer system of claim 15, further comprising the program instructions executable to:
   determine whether the concept drift is present, by determining whether a concept drift flag is true or false; and
   in response to determining that the concept drift is present, incorporate drifted targets into a dataset for the retraining of the artificial intelligence model.

19. The computer system of claim 15, wherein further comprising the program instructions executable to:
   determine whether the model drift is present, by determining whether a model drift flag is true or false;
   in response to determining that the model drift is present, determine whether either the data drift or the concept drift is present; and
   in response to determining that the model drift is not present, determine whether the concept drift is present.

20. The computer system of claim 19, further comprising program instructions executable to:
   in response to determining that the model drift is present and determining that either the data drift or the concept drift is present, perform hyperparameter search in the retraining;
   in response to determining that the model drift is present and determining that neither the data drift nor the concept drift is present, perform model selection to select a new artificial intelligence model and perform hyperparameter search in the retraining; and
   in response to determining that the model drift is not present and determining that the concept drift is present, perform model selection to select the new artificial intelligence model and perform hyperparameter search in the retraining.

\* \* \* \* \*